United States Patent
Wickham et al.

[15] 3,693,773
[45] Sept. 26, 1972

[54] CARRIAGE STOP FOR RADIAL ARM SAW

[72] Inventors: John L. Wickham, Glen Arm; Erik J. De Witt, Lutherville, both of Md.

[73] Assignee: The Black and Decker Manufacturing Company, Towson, Md.

[22] Filed: Aug. 21, 1970

[21] Appl. No.: 65,952

[52] U.S. Cl. ............ 192/142 R, 24/263 A, 29/65, 143/6 A, 192/143, 200/47
[51] Int. Cl. ....... F16d 71/00, B23g 5/00, H01h 21/28
[58] Field of Search ............ 192/142 R, 143; 200/47; 24/263 SB, 263 SW, 263 A; 143/6 A; 29/65

[56] References Cited

UNITED STATES PATENTS

| | | | |
|---|---|---|---|
| 2,255,706 | 9/1941 | Height | 200/47 |
| 3,246,546 | 4/1966 | Madden | 143/6 A X |
| 1,400,491 | 12/1921 | Mechling | 24/263 A |
| 2,142,303 | 1/1939 | Crouch | 143/6 A |
| 2,854,113 | 9/1958 | Hallden | 192/143 X |
| 3,171,511 | 3/1965 | Pierce | 192/143 X |

*Primary Examiner*—Allan D. Herrmann
*Attorney*—Leonard Bloom, Joseph R. Slotnik and Edward D. Murphy

[57] ABSTRACT

A radial arm saw including a base frame having an upstanding post supported thereon. An arm is pivoted to the post and extends over a work table supported upon the base frame. A powered circular saw and saw carriage is suspended from the arm and is movable therealong to cut a workpiece on the table. The carriage is moved along the arm by motor means which is automatically reversed or turned off by switch means on the carriage engageable with actuator means on the arm. The actuator means is incrementally adjustable along the arm and includes positive stop means for the carriage should the switch means fail to operate.

15 Claims, 7 Drawing Figures

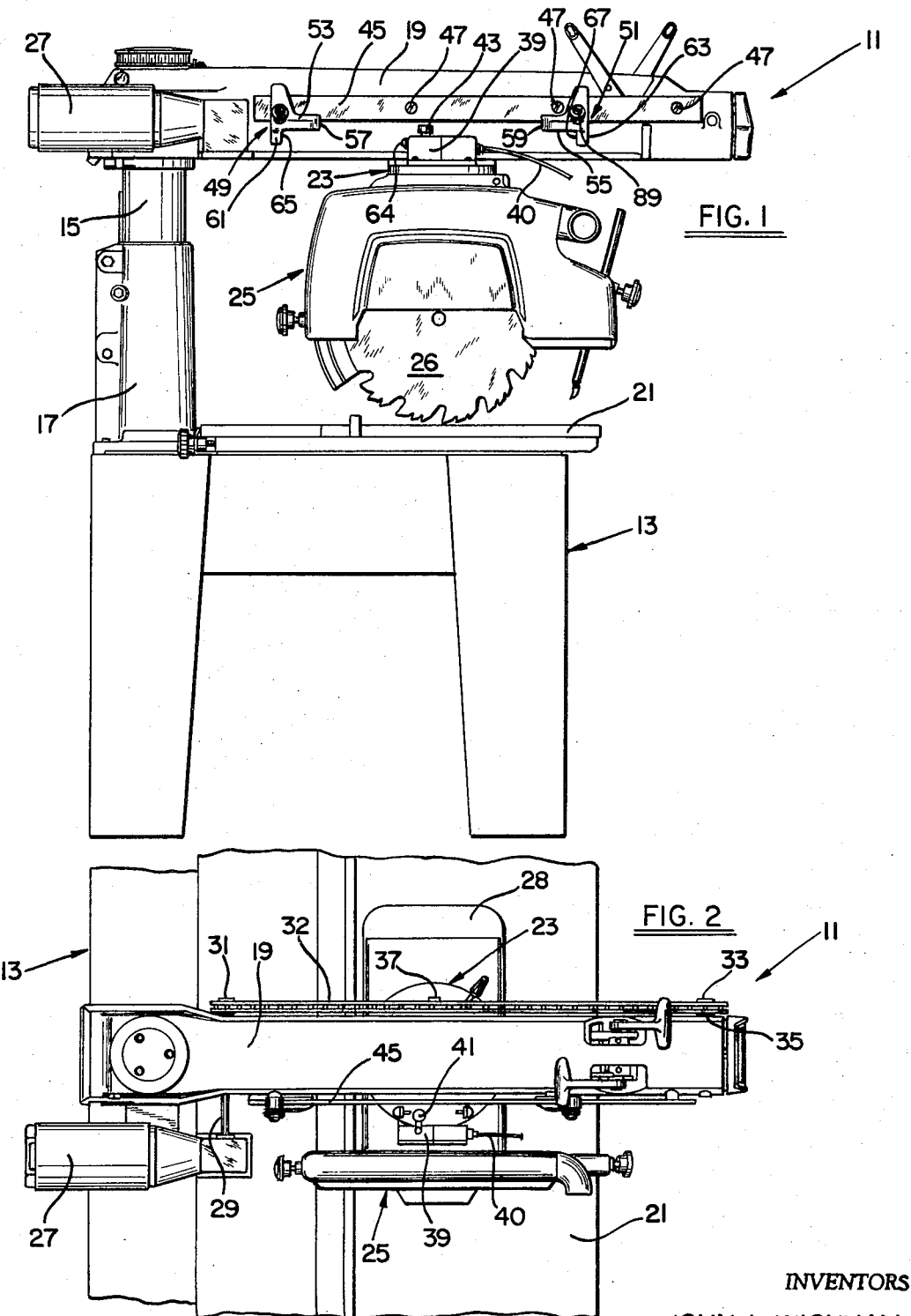

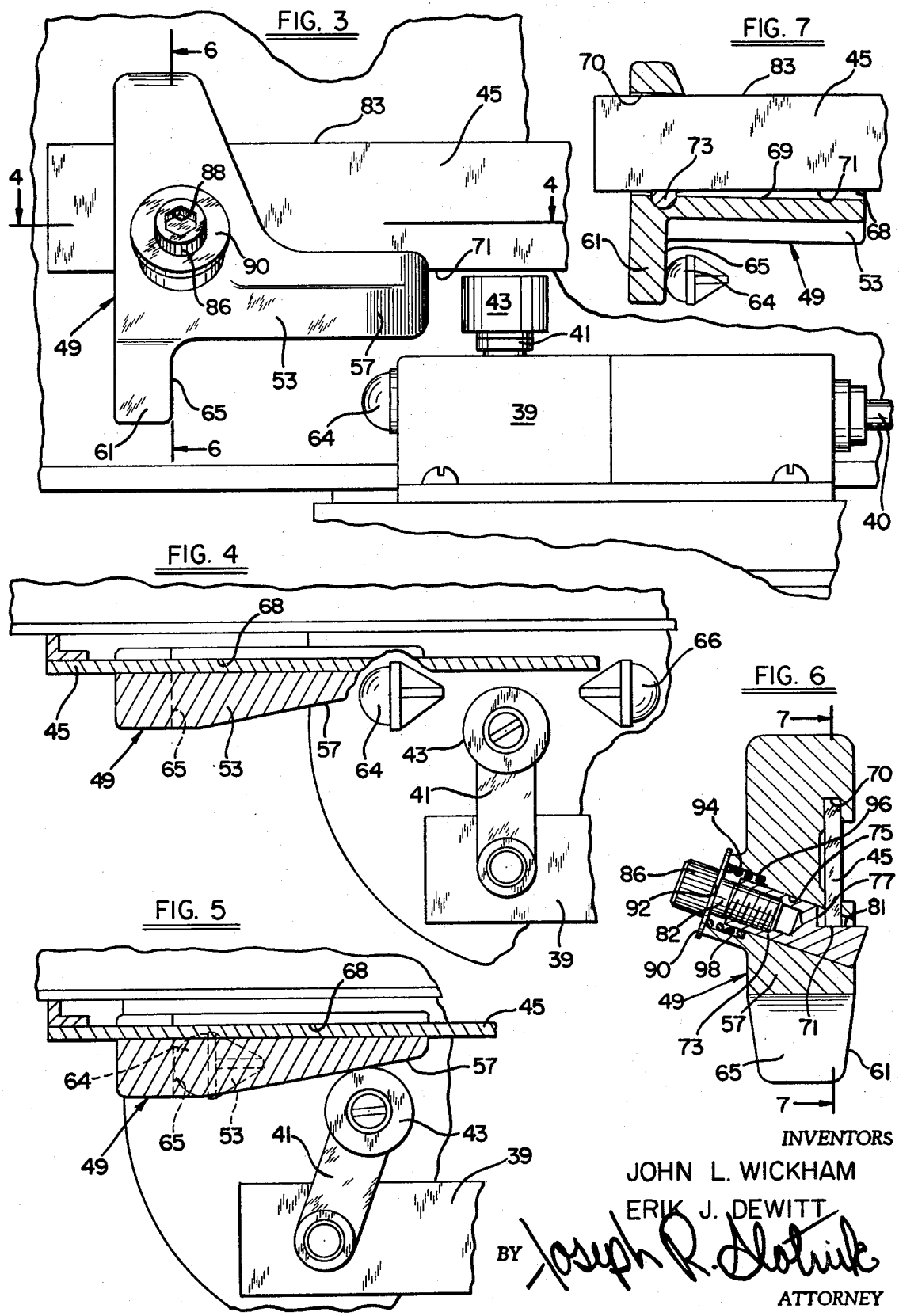

CARRIAGE STOP FOR RADIAL ARM SAW

SUMMARY OF THE INVENTION

The present invention is directed to a novel adjustable carriage control and stop construction for use on a powered carriage-type tool such as a radial arm saw. The control construction is cooperable with switch means on the carriage to stop or reverse carriage travel and, should the switch means fail to operate, the stop construction provides a positive stop to prevent overtravel of the carriage which might otherwise result in damage to the tool and/or injury to the operator. The carriage control and stop advantageously is incrementally adjustable throughout a wide range of positions to provide maximum versatility in the tool, is quickly and easily secured in all adjusted positions manually without the need for special tools and in a manner which prevents movement thereof even when subjected to relatively high forces by the moving carriage, and, in addition, is constructed to prevent carriage overrun even when not positively secured in place.

Main objects of the present invention, therefore, are to provide an improved carriage control and stop construction for a powered carriage-type machine tool or the like which is adapted to actuate switch means on the carriage for carriage control and provides a positive carriage stop should the switch fail to operate, which facilitates ready and incremental adjustment throughout a wide range of positions, which, when secured in position, develops increased holding power when positively engaged by the traveling carriage upon switch failure, and which bars carriage overtravel even when not tightened in position.

Additional important objects of the present invention reside in the provision of an improved carriage stop construction of the above character which embodies versatility in that it can be used with a variety of powered carriage-type devices, which is relatively inexpensive to manufacture and includes a minimum of separate parts, which is durable in construction, and which is reliable in use.

Further objects and advantages of the present invention will become more apparent from a consideration of the detailed description to follow taken in conjunction with the drawings annexed hereto.

BRIEF DESCRIPTION OF THE DRAWINGS

FIG. 1 is a side elevational view illustrating a radial arm saw embodying the present invention;

FIG. 2 is a top plan view of a portion of FIG. 1;

FIG. 3 is an enlarged elevational view of the carriage stop construction of the present invention and showing the parts in position prior to switch actuation;

FIG. 4 is a sectional view of FIG. 3 taken along the line 4—4 thereof;

FIG. 5 is a view similar to FIG. 4 but showing the switch actuated and the positive stop engaged;

FIG. 6 is a sectional view of FIG. 3 taken along the line 6—6 thereof; and

FIG. 7 is a reduced scale sectional view of FIG. 6 taken along the line 7—7 thereof and showing the stop engaged with the carriage and in an increased holding power position.

BROAD STATEMENT OF THE INVENTION

Broadly described, the present invention relates to a carriage-type tool including an elongated support, carriage means movable along said support, power means adapted to move said carriage along said support, switch means on said carriage connected to said power means, control and stop means on said support disposed to engage said switch means during travel of said carriage, said control and stop means including a member slidably embracing elongated means on said support for adjustment therealong, manual means releasably clamping said member to said elongated means, said member having a control surface engageable with said switch means when said carriage reaches a predetermined position, said member including a stop surface adapted to engage fixed means on said carriage following engagement of said switch means and said control surface, said stop surface being spaced from said elongated means in a direction transverse to its length, whereby engagement of said stop surface by said fixed means on said carriage tends to pivot said member relative to said elongated means and increases the clamping force thereon.

In another aspect, the present invention relates to a carriage-type power tool comprising an elongated support, a tool carriage supported for movement along said support, reversable power means for moving said carriage in opposite directions along said support, switch means on said carriage for reversing or stopping said power means and correspondingly the travel of said carriage along said support, a pair of actuating means adjustably mounted on said support in spaced relation and engageable with said switch means at opposite ends of the travel of said carriage along said support, each said actuating means also including positive stop means engageable with fixed means on said carriage, whereby to prevent said carriage from traveling past the positions defined by said actuating means should said switch means fail to operate, each said actuating means including gripping means operable upon engagement of said positive stop means by said fixed means on said carriage, whereby to tightly pinch said support and prevent movement of said stop means.

In still another aspect, the present invention relates to an adjustable stop assembly comprising an elongated bar, a stop member slidably disposed on said bar, said stop member having a pair of surfaces adapted to confront a pair of elongated surfaces of said bar, clamping means on said stop member engageable with said bar and operable to press one of said stop member surfaces against an adjacent said bar surface, the other of said stop member and bar surfaces being spaced from one another thereby allowing said stop member to pivot relative to said bar, said stop member having an abutment surface disposed to one side of and substantially normal to said elongated surface, whereby pressure against said abutment surface in a direction generally lengthwise of said bar pivots said stop member and presses one end of said one stop member surface tightly against said adjacent elongated surface of said bar and increases the clamping force thereon.

In yet another aspect, the present invention relates to an adjustable stop assembly for a traveling carriage, said assembly including an elongated bar extending generally parallel to the direction of travel of said carriage, a stop member slidably disposed on said bar and defining opposed first and second surfaces disposed in spaced confronting relation to first and second opposed surfaces, respectively, on said bar, at least one of said confronting stop member and bar surfaces being spaced to allow limited pivotal movement of said stop member, means defining abutment means on said stop member engageable by means on said carriage and disposed to the side of said first surfaces opposite said second surfaces, said stop member being adapted to pivot slightly relative to said bar when engaged by said means on said carriage, whereby to pinch at least portions of said first and second surfaces on said stop member against said first and second surfaces on said bar, said first and second surface portions being spaced a small but definable distance from one another in the direction of said bar, whereby to prevent movement of said stop member by said carriage.

In yet another aspect, the present invention relates to an adjustable stop assembly comprising an elongated bar, a stop member slidably disposed on said bar, said stop member having a surface adapted to confront an elongated surface of said bar, clamping means on said stop member engageable with said bar and operable to press said stop member surface against said bar surface, said clamping means including a member slidable on said stop member and engageable with another elongated surface of said bar opposite said first mentioned elongated surface, manually operable means adapted to move said clamping means into clamping engagement with said bar, said stop member having an abutment surface disposed to one side of and substantially normal to said first mentioned elongated surface, whereby pressure against said abutment surface in a direction generally lengthwise of said bar pivots said stop member and presses one end of said first mentioned stop member surface tightly against said elongated surface of said bar and increases the clamping force thereon.

In yet another aspect, the present invention relates to an adjustable stop assembly comprising an elongated bar, a stop member slidably disposed on said bar, said stop member having a surface adapted to confront an elongated surface of said bar, clamping means on said stop member engageable with said bar and operable to press said stop member surface against said bar surface, said stop member having an abutment surface disposed to one side of and substantially normal to said elongated surface, whereby pressure against said abutment surface in a direction generally lengthwise of said bar pivots said stop member and presses one end of said stop member surface tightly against elongated surface of said bar and increases the clamping force thereon, said stop member being effective to grip said bar surface at incrementally spaced positions therealong to thereby prevent movement of said stop member under the action of pressure against said abutment surface generally lengthwise of said bar independently of said clamping means.

In yet another aspect, the present invention relates to an adjustable stop assembly comprising an elongated bar, a stop member slidably embracing said bar and movable therealong, a means for locking said stop member at incrementally spaced positions along said bar, said locking means including a pin notched to receive a portion of said bar, said notch defining a wedged surface adapted to wedge against said bar whereby to clamp said stop member to said bar, manually operable means on said stop member for selectively locking and releasing said pin in wedging engagement with said bar.

DETAILED DESCRIPTION

Referring now more specifically to the drawings, a radial arm saw embodying the present invention is illustrated generally at 11 in FIGS. 1 and 2. However, it should be understood that this tool is illustrative only and that the present invention finds use in a variety of power driven, carriage-type devices.

With this in mind, the radial arm saw 11 is seen to include a base frame 13 having an upstanding column 15 supported thereon by a column base 17. A radial arm 19 is mounted on the column 15 and extends over a horizontal worktable 21 also supported upon the base frame 13. A carriage 23 is suspended from the arm 19 and is movable therealong and carries a circular saw 25 including a saw blade 26 driven by a motor 28. Thus, when the saw 25 is turned "on" and the carriage 23 moved along the arm 19, a workpiece (not shown) positioned on the worktable 21 is cut.

The carriage 23 is adapted to be powered back and forth along the arm 19. To this end, a reversible drive motor 27 supported at one end of the arm 19 has an output rotary shaft 29 to which a drive sprocket 31 is secured. A chain 32 is entrained over the sprocket 31 and a driven sprocket 33 supported on a shaft 35 at the other end of the arm 19. The chain 32 is fixed to a crosshead 37 on the carriage 23. Thus, when the motor 27 is energized, the carriage 23 is moved along the arm 19, the direction of travel of the carriage 23 being dependent upon the direction of rotation of the motor shaft 29.

Desirably, the driving motor 27 is automatically controlled by the position of the carriage 23 on the arm (and the saw 25 relative to the table 21) e.g., the motor 27 is reversed when the saw 25 reaches the end of a cut and is turned "off" and/or actuates an automatic work feed when repositioned ready for the next cut. To this end, a control switch 39 connected to the motor 27 by a lead 40 is mounted on the carriage 23 and has an actuating lever 41 pivotally mounted at one end thereon. The lever 41 extends horizontally from the switch 39 and inwardly toward the arm 19 and has a roller 43 at its other end.

An elongated, generally rectangular bar 45 is secured to the arm 19 by screws 47 and extends adjacent the path of travel of the roller 43. A pair of oppositely facing control and stop members 49, 51 are adjustably secured to the bar 45 adjacent opposite ends thereof. Each of the members 49, 51 has a horizontally extending portion 53, 55 which defines a tapered control surface 57, 59 positioned to engage the roller 43 and pivot the switch lever 41 as the carriage 23 travels along the arm 19.

In use, the carriage 23 is initially at the inner limit of its travel along the arm 19 (nearest to the column 15) with the switch roller 43 against the control surface 57 of stop 49 and the drive motor 27 is "off." With a workpiece in position on the table 21, the circular saw motor 28 and the drive motor 27 are turned "on" whereupon the saw blade 26 rotates and the carriage 23 travels away from the column 15 to cut the workpiece. When the carriage 23 has traveled far enough to bring the switch roller 43 into engagement with the control surface 59 on stop 51, the switch lever 41 is pivoted in a counterclockwise direction, as seen in FIG. 2 and the drive motor 27 reverses, whereupon the carriage 23 moves inwardly along the arm 19 and toward the column 15. When the roller 43 re-engages the cam surface 57 on stop 49, the switch lever 41 pivots clockwise as seen in FIGS. 2 and 5 and turns the drive motor 27 "off." Alternatively, this action of the switch lever 41 could be utilized to actuate a feed mechanism for the workpiece, or some other operation if desired.

It will be appreciated that should the switch 39 fail to operate at either end of travel of the carriage 23, there likely would result damage to the tool 11 and/or injury to the operator. To prevent this, the present invention integrates a positive carriage stop with the switch control mechanism. This positive stop assembly comes into play and stops the carriage 23 if the switch 39 fails to reverse or stop the motor 27.

To this end, each of the control and stop members 49, 51 includes a dependent portion 61, 63 which defines a vertical abutment surface 65, 67 respectively. The carriage 23 has a pair of resilient bumpers 64, 66 disposed to engage the surfaces 65, 67 substantially at or immediately after the point where the switch 39 is actuated by the roller 43 being engaged with the control surfaces 57, 59, Thus, should the switch 39 fail to operate, engagement between the bumper 64 and surface 65 or bumper 66 and surface 67 stops the carriage 23. Preferably, a shear pin or the like is provided in the drive train between the motor 27 and carriage 23 and is designed to fail at this point to prevent damage to the motor 27.

It will be appreciated that relatively high forces are developed on the members 49, 51 by the traveling carriage 23 should the bumpers 64, 66 engage the abutment surfaces 65, 67. In order for the members 49, 51 to function properly, therefore, it is necessary that they be able to withstand these high forces. However, it is also important that the members 49, 51 be quickly and easily secured to and released from the bar 45 pursuant to adjustment therealong and that they be capable of being adjusted incrementally therealong, and further that the members 49, 51 be capable of preventing overtravel of the carriage 23 even if not secured to the bar 45.

Thus, the control and stop member 49 is seen in FIGS. 3–7 to slidably fit over the bar 45. The horizontal leg 53 of the member 49 defines a shallow internal groove 68 having a relatively long surface 69 disposed in confronting relation to a surface 71 on the underside of the bar 45. The upper part of the member defines a relatively short surface 70 opposed to surface 69 and which confronts a top surface 83 of the bar 45, surfaces 71, 83 forming a pair of surfaces on bar 45. A lock pin 73 extends slidably through a bore 75 in the lower part of the member 49 and has a V-shaped notch 77 adjacent one end. See FIG. 6. The V-shaped notch 77 of the bottom lock pin 73 defines a flat surface 81 adapted to engage the bottom surface 71 of the bar 45. A screw 82 is threaded into the other end of the lock pin 73 and has an outer enlarged end 86 provided with a socket 88. A washer 90 engages against a shoulder 92 formed by the end 86 and engages one end of a compression spring 94, the other end of which engages a shoulder 96 in a counterbore 98.

To secure the member 49 in position along the bar 45, the enlarged end 86 of screw 82 is turned in a direction to draw the lock pin 73 into the bore 75 (toward the left as seen in FIG. 6). Engagement between the flat 81 and the bar surface 71 prevents the lock pin 73 from turning. As the lock pin 73 moves toward the screw 82, the flat 81 is pressed against the bottom surface 71 of the bar 45. This, in turn, lowers the member 49 slightly on the bar 45 until the top surface 83 of the bar 45 snugly engages the surface 70, the surface 69 being spaced from surface 71. Basically, the member 49, through the lock pin 73 and engaged surfaces 70, 83 which form gripping means, frictionally grips the bar 45; however, if the switch 39 fails to operate and the bumper 64 presses against the abutment surface 65, the member 49 is pivoted or rocked slightly in a clockwise direction as seen in FIGS. 3 and 7 from basically the position shown in FIG. 3 to that shown in FIG. 7. This causes the right hand end of the surface 70 (as seen in FIG. 7) to tightly engage the bar surface 83, and flat surface 81 of lock pin 73 to tightly engage bar surface 71 in a manner illustrated in FIG. 7. Thus, the greater the force of the carriage 23 against the abutment surface 65, the greater the holding force of the member 49 on the bar 45. By positioning the right-hand end of the surface 70 a small but definable distance from the lock pin 73 in the direction of the elongated bar 45, the pinching forces developed at the end of surface 70 on the bar surface 83, and by the lock pin 73 on the bar surface 71, when the carriage bumper 64 presses against the abutment surface 65, are sufficient to insure that the member 49 will not move even if the operator inadvertently fails to tighten the screw 82. The spring 94 serves to take up slack if the screw 82 is not tightened and holds the surface 81 snugly against the bar surface 71; however, even if the screw 82 is removed, the geometry of surfaces 77, 81 of lock pin 73 with respect to bar surface 71 is such that lock pin surface 81 and surface 70 will tightly engage bar surfaces 71, 83 when bumper 64 engages surface 65 and will stop travel of the carriage upon failure of switch 39. The forces on member 49 are not so high as to require unusually high force withstanding capabilities in the member 49.

The construction of the control and stop member 51 is substantially the same as the member 49 except that the member 51 is reversed to present a control surface 59 and an abutment surface 67 opposite the control surface 57 and abutment surface 65 on the member 49. Thus, the member 51 provides a switch control and a positive stop for the carriage 23 in the opposite direction of carriage travel from the member 49.

It will be appreciated that the control and stop members 49, 51 are readily adjustable along the bar 45 by manually releasing the screw 82 on the member 49 and a screw 89 on the member 51. The member 49 can then be moved along the bar 45 by first pressing the screw 82 inwardly to move the pin 73 out of wedging engagement with the bar. The member 51 is similarly movable by pressing the screw 89 inwardly. The members 49, 51 are resecured in any position along the bar 45 by manually tightening the screws 82, 89. However, as described above, the action of the spring 94 locks the member 49 in place on the bar 45 (as does a similar spring on the member 51) should the screws 82, 89 not be retightened. The control surfaces 57, 59 then function, for example, to reverse the direction of travel of and stop the carriage 23 by reversing and stopping, respectively, the motor 27. In addition, the members 49, 51 present positive stops for the carriage 23, in abutment surfaces 65, 67, for all adjusted position of the members 49, 51 which functions to prevent damage to the tool 11 and/or injury to the operator.

By the foregoing, there has been disclosed an improved control and positive stop construction for the carriage of a carriage-type device calculated to fulfill the inventive objects set forth above, and while a preferred form of the invention has been illustrated and described in detail, various additions, substitutions, modifications and omissions may be made thereto without departing from the spirit of the invention.

I claim:

1. A carriage-type tool including an elongated support, carriage means movable along said support, power means adapted to move said carriage along said support, switch means on said carriage connected to said power means, control and stop means on said support disposed to engage said switch means during travel of said carriage, said control and stop means including a member slidably embracing elongated means on said support for adjustment therealong, manual means releasably clamping said member to said elongated means, said member having a control surface engageable with said switch means when said carriage reaches a predetermined position, said member including a stop surface adapted to engage fixed means on said carriage following engagement of said switch means and said control surface, said stop surface being spaced from said elongated means in a direction transverse to its length, whereby engagement of said stop surface by said fixed means on said carriage tends to pivot said member relative to said elongated means and increases the clamping force thereon.

2. A tool as defined in claim 1 wherein said stop surface extends substantially normal to said elongated means.

3. A tool as defined in claim 1 wherein said control surface includes a tapered cam surface inclined relative to said elongated means.

4. A tool as defined in claim 1 wherein said member includes a pair of opposed surfaces which confront a pair of surfaces on said elongated means, said stop surface being disposed to the side of one of said member surfaces remote from the other of said member surface, said other of said member surfaces having a relatively short dimension in the direction of said elongated means, said member when engaged by said fixed means on said carriage tending to pivot about an axis generally perpendicular to said elongated means.

5. A tool as defined in claim 4 wherein said member surfaces and said elongated means surfaces are generally parallel to one another.

6. A carriage-type power tool comprising an elongated support, a tool carriage supported for movement along said support, reversible power means for moving said carriage in opposite directions along said support, switch means on said carriage for reversing or stopping said power means and correspondingly the travel of said carriage along said support, a pair of actuating means adjustably mounted on said support in spaced relation and engageable with said switch means at opposite ends of the travel of said carriage along said support, each said actuating means also including positive stop means engageable with fixed means on said carriage, whereby to prevent said carriage from traveling past the positions defined by said actuating means should said switch means fail to operate, each said actuating means including gripping means operable upon engagement of said positive stop means by said fixed means on said carriage, whereby to tightly pinch said support and prevent movement of said stop means.

7. A tool as defined in claim 6 wherein each of said actuating means includes manually operable means engageable with said support and clamping said actuating means thereto, said gripping means being operable to prevent movement of said stop means independently of said manually operable means.

8. An adjustable stop assembly comprising an elongated bar, a stop member slidably disposed on said bar, said stop member having a pair of surfaces adapted to confront a pair of elongated surfaces of said bar, clamping means on said stop member engageable with said bar and operable to press one of said stop member surfaces against an adjacent bar surface, the other of said stop member and bar surfaces being spaced from one another thereby allowing said stop member to pivot relative to said bar, said stop member having an abutment surface disposed to one side of and substantially normal to said elongated surface, whereby pressure against said abutment surface in a direction generally lengthwise of said bar pivots said stop member and presses one end of said one stop member surface tightly against said adjacent elongated surface of said bar and increases the clamping force thereon.

9. An adjustable stop assembly for a traveling carriage, said assembly including an elongated bar extending generally parallel to the direction of travel of said carriage, a stop member slidably disposed on said bar and defining opposed first and second surfaces disposed in confronting relation to first and second opposed surfaces, respectively, on said bar, at least one of said confronting stop member and bar surfaces being spaced to allow limited pivot movement of said stop member, means defining abutment means on said stop member engageable by means on said carriage and disposed to the side of said first surfaces opposite said second surfaces, said stop member being adapted to pivot slightly relative to said bar when engaged by said means on said carriage, whereby to pinch at least portions of said first and second surfaces on said stop member against said first and second surfaces on said bar, said first and second surface portions being spaced a small but definable distance from one another in the direction of said bar, whereby to prevent movement of said stop member by said carriage.

10. An adjustable stop assembly comprising an elongated bar, a stop member slidably disposed on said bar, said stop member having a surface adapted to confront an elongated surface of said bar, clamping means on said stop member engageable with said bar and operable to press said stop member surface against said bar surface, said clamping means including a member slidable on said stop member and engageable with another elongated surface of said bar opposite said first mentioned elongated surface, manually operable means adapted to move said clamping means into clamping engagement with said bar, said stop member having an abutment surface disposed to one side of and substantially normal to said first mentioned elongated surface, whereby pressure against said abutment surface in a direction generally lengthwise of said bar pivots said stop member and presses one end of said first mentioned stop member surface tightly against said elongated surface of said bar and increases the clamping force thereon.

11. A stop assembly as defined in claim 10 wherein said clamping member includes an elongated pin adapted to wedge against said another elongated surface of said bar.

12. A stop assembly as defined in claim 10 which includes spring means normally biasing said clamping member into clamping engagement with said bar.

13. A stop assembly as defined in claim 12 wherein said manually operable means includes a screw operatively threadedly engageable with said clamping member whereby to press said clamping member into clamping engagement with said bar, said screw and clamping member being manually movable conjointly relative to said stop member and against the force of said spring means whereby to release said clamping member from said bar and allow movement of said stop member relative to said bar.

14. An adjustable stop assembly comprising an elongated bar, a stop member slidably disposed on said bar, said stop member having a surface adapted to confront an elongated surface of said bar, clamping means on said stop member engageable with said bar and operable to press said stop member surface against said bar surface, said stop member having an abutment surface disposed to one side of and substantially normal to said elongated surface, whereby pressure against said abutment surface in a direction generally lengthwise of said bar pivots said stop member and presses one end of said stop member surface tightly against elongated surface of said bar and increases the clamping force thereon, said stop member being effective to grip said bar surface at incrementally spaced positions therealong to thereby prevent movement of said stop member under the action of pressure against said abutment surface generally lengthwise of said bar independently of said clamping means.

15. An adjustable stop assembly comprising an elongated bar, a stop member slidably embracing said bar and movable therealong, a means for locking said stop member at incrementally spaced positions along said bar, said locking means including a pin notched to receive a portion of said bar, said notch defining a wedged surface adapted to wedge against said bar whereby to clamp said stop member to said bar, manually operable means on said stop member for selectively locking and releasing said pin in wedging engagement with said bar.

* * * * *